US007487033B2

(12) United States Patent
Hijikata

(10) Patent No.: US 7,487,033 B2
(45) Date of Patent: Feb. 3, 2009

(54) ENGINE CONTROL APPARATUS

(75) Inventor: Kenji Hijikata, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 64 days.

(21) Appl. No.: 11/802,175

(22) Filed: May 21, 2007

(65) Prior Publication Data

US 2007/0271026 A1 Nov. 22, 2007

(30) Foreign Application Priority Data

May 22, 2006 (JP) ............................ 2006-142138

(51) Int. Cl.
*G06F 19/00* (2006.01)
*F02D 41/00* (2006.01)

(52) U.S. Cl. .................. 701/113; 123/685; 123/406.47

(58) Field of Classification Search ................ 701/101, 701/103, 104, 105, 113; 123/434, 681, 685, 123/406.11, 406.23, 406.24, 406.35, 406.47
See application file for complete search history.

(56) References Cited

U.S. PATENT DOCUMENTS 5,841,201 A * 11/1998 Tabata et al. .............. 290/40 C
5,982,045 A * 11/1999 Tabata et al. .................. 290/17
6,073,610 A * 6/2000 Matsumoto et al. ......... 123/396
2006/0276948 A1* 12/2006 Toda .......................... 701/50
2007/0247975 A1* 10/2007 Masuda et al. ................ 368/27
2007/0276549 A1* 11/2007 Hijikata ......................... 701/1
2008/0092849 A1* 4/2008 Mizuguchi ............. 123/339.16

FOREIGN PATENT DOCUMENTS

JP 5-65037 3/1993
JP 5-332236 12/1993

* cited by examiner

*Primary Examiner*—John T Kwon
(74) *Attorney, Agent, or Firm*—McGinn IP Law Group, PLLC

(57) ABSTRACT

An engine control apparatus of the present invention sets a target torque τe, when the save mode m2 is set as an engine mode, according to the formula:

$$\tau e \leftarrow TRQ2*RATIO1+TRQ3*(1-RATIO1)$$

Basic target torque TRQ2 and TRQ3 are set based on the engine speed Ne and the throttle opening-degree θacc and with reference to the normal mode map Mp1 and the power mode map Mp3 respectively. The correction factor RATIO1 is an addition rate which is set based on an accelerator opening-degree θacc and a vehicle speed V and with reference to a correction factor map Mr1. The correction factor map Mr1 stores a correction factor RATIO1 near 0 (although 1≧RATIO1>0) when the vehicle speed V is low and the accelerator opening-degree θacc is high.

10 Claims, 12 Drawing Sheets

FIG.8A Mp1
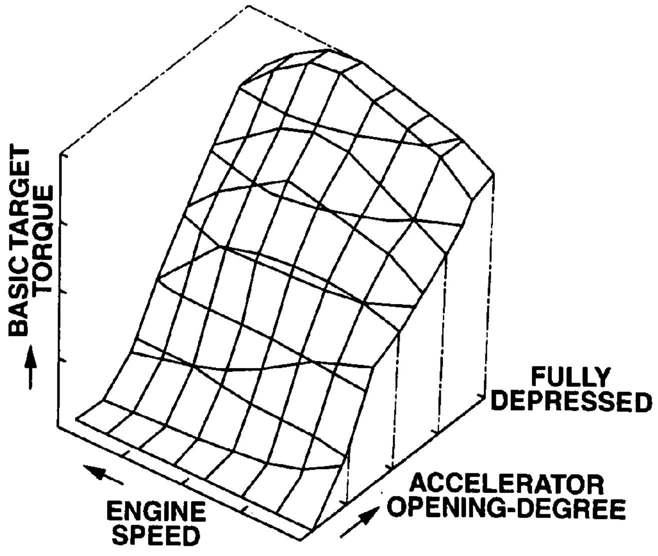
FIG.8B Mp2
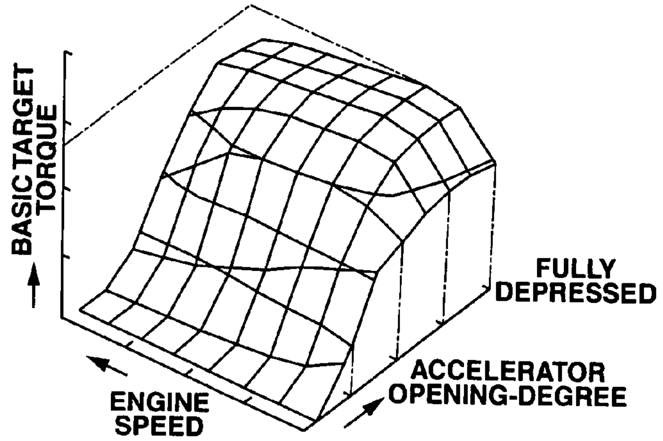
FIG.8C Mp3
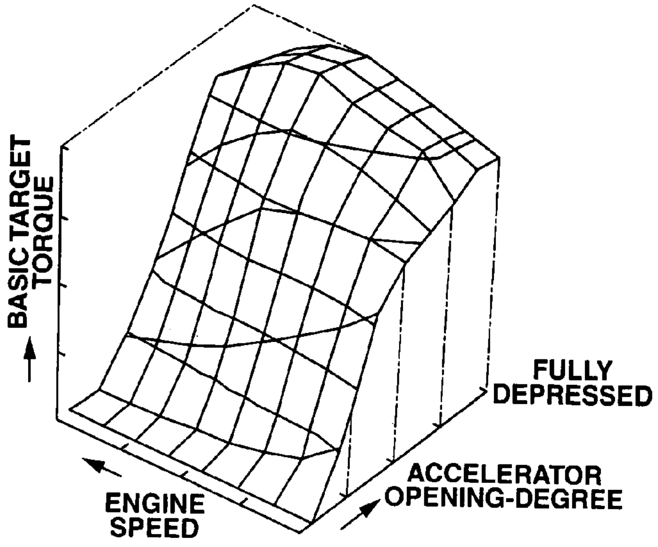

Mr1

Mr2

FIG.14A Mpθ1
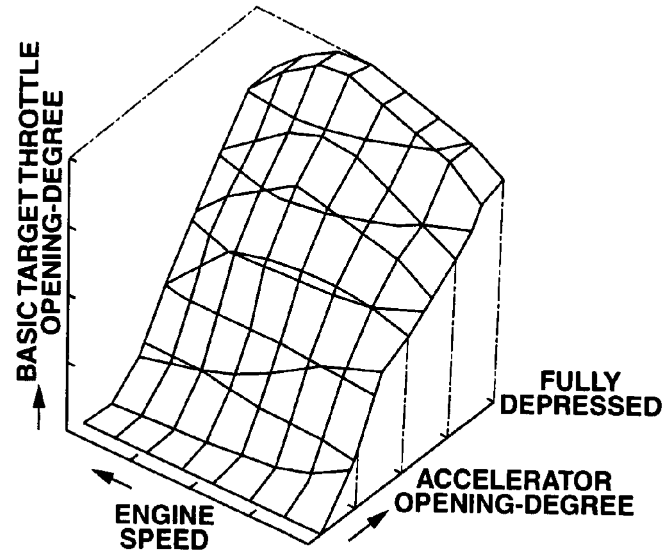
FIG.14B Mpθ2
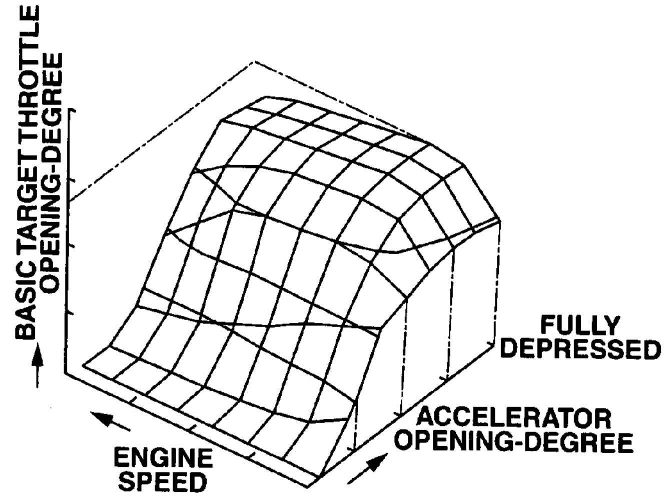
FIG.14C Mpθ3
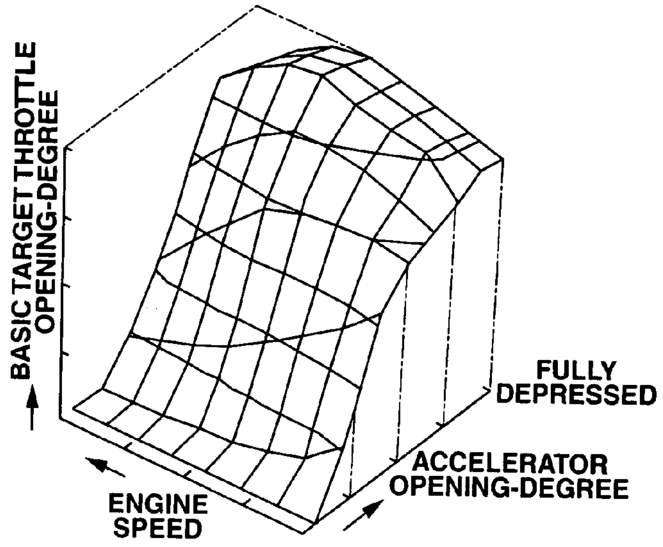

ENGINE CONTROL APPARATUS

The disclosure of Japanese Patent Application No. 2006-142138 filed on May 22, 2006 Japan including the specification, drawings and abstract is incorporated herein by reference in its entirety.

BACKGROUND OF THE INVENTION

1. Field of the Invention

The present invention relates to an engine control apparatus having engine control modes including at least a high output mode and an output restricted mode.

2. Description Related Art Statement

Generally, a vehicle such as an automobile preferably has both excellent fuel economy performance and driving performance (acceleration response), but it is hard to achieve a vehicle which is provided with both of them. Thus, a technology is known in which a plurality of control modes including a standard normal mode, an economy mode for reducing fuel consumption, and a power mode for increasing output are set so that a driver can select one of the control modes through an operation such as a switching to provide both of fuel economy performance and driving performance to a vehicle.

For example, Japanese Patent Application Laid-Open No. 5-332236 discloses a technology for selecting an air-fuel ratio map and an ignition timing map which correspond to a control mode (one of economy mode and power mode) selected by a driver so as to perform fuel injection control and ignition timing control based on the selected maps.

Japanese Patent Application Laid-Open No. 5-65037 discloses a technology for improving both fuel economy performance and driving performance (acceleration response) by setting the characteristics of opening-degrees of an electronic controlled throttle and characteristics of transmission of an automatic transmission for each control mode (economy mode and power mode) in association with each other, and performing the throttle opening-degree control and the transmission control in accordance with these characteristics.

However, in the above technologies disclosed in the documents, at a start of a vehicle, if a driver of the vehicle selects a control mode such as an economy mode in which an output is restricted to reduce fuel consumption, an engine of the vehicle is operated under a high load, so that a hill start of a vehicle on a steep grade for example in an economy mode sometimes results in an insufficient torque, and an excellent starting performance cannot be attained.

On the other hand, if a driver of the vehicle selects a control mode such as a power mode for increasing output at the start of a vehicle, a slight depression of an accelerator pedal leads to a considerable change of a driving torque, so that a start of a vehicle on level ground for example in the power mode in which an engine of the vehicle is operated under a low load sometimes results in a shock of a sudden start for the driver due to a rapid acceleration.

As a result, at a start in a restricted output mode such as an economy mode selected by a driver, there is a range that the driver feels an insufficient torque, while at a start in a high output mode such as a power mode, there is a range that the driver feels a shock of a sudden start due to an increased torque. In either mode at the start of a vehicle, an excellent driving performance cannot be attained.

SUMMARY OF THE INVENTION

One object of the present invention is to provide an engine control apparatus in a vehicle which operates in one of a plurality of control modes a driver can select as desired, and achieves an excellent starting performance in any control mode without a feeling of excess or insufficient torque.

A first aspect of the present invention provides an engine control apparatus for controlling an engine in a mode which is set from plurality of engine control modes including at least a high output mode for controlling the engine with a higher output and an output restricted mode for controlling the engine with a lower restricted output than that in the high output mode, including: mode determining unit configured to determine which one of the high output mode and the output restricted mode is set as the control mode; vehicle speed detecting unit configured to detect a vehicle speed; required output detecting unit configured to detect an output required by an external operation; and target output setting unit configured to set a target output by correcting an output performance in the output restricted mode into the higher output range, when the mode determining unit determines that the output restricted mode is set as the control mode, and the detected vehicle speed is low and the detected required output is large.

A second aspect of the present invention provides an engine control apparatus for controlling an engine in a mode which is set from plurality of engine control modes including at least a high output mode for controlling the engine with a higher output and an output restricted mode for controlling the engine with a lower restricted output than that in the high output mode, including: mode determining unit configured to determine which one of the high output mode and the output restricted mode is set as the control mode; vehicle speed detecting unit configured to detect a vehicle speed; required output detecting unit configured to detect an output required by an external operation; and target output setting unit configured to set a target output by correcting an output performance in the high output mode into the lower output range, when the mode determining unit determines that the high output mode is set as the control mode, and the detected vehicle speed is low and the detected required output is small.

According to the present invention, when the output restricted mode is set as the control mode and the vehicle speed is low and the required output is high, a target output is set by correcting an output performance in the output restricted mode into the higher output range, and when the high output mode is set as the control mode and the vehicle speed is low and the required output is low, a target output is set by correcting an output performance in the high output mode into the lower output range. Thereby whichever the control mode is set, an excellent starting performance can be attained without an excess or insufficient torque.

The above and other objects, features and advantages of the invention will become more clearly understood from the following description referring to the accompanying drawings.

BRIEF DESCRIPTION OF THE DRAWINGS

FIG. 8A is a conceptual diagram showing a normal mode map;

FIG. 8B is a conceptual diagram showing a save mode map;

FIG. 8C is a conceptual diagram showing a power mode map;

FIG. 14A is a conceptual diagram showing a normal mode map;

FIG. 14B is a conceptual diagram showing a save mode map; and

FIG. 14C is a conceptual diagram showing a power mode map.

DETAILED DESCRIPTION OF THE PREFERRED EMBODIMENTS

First Embodiment

Figure 1:
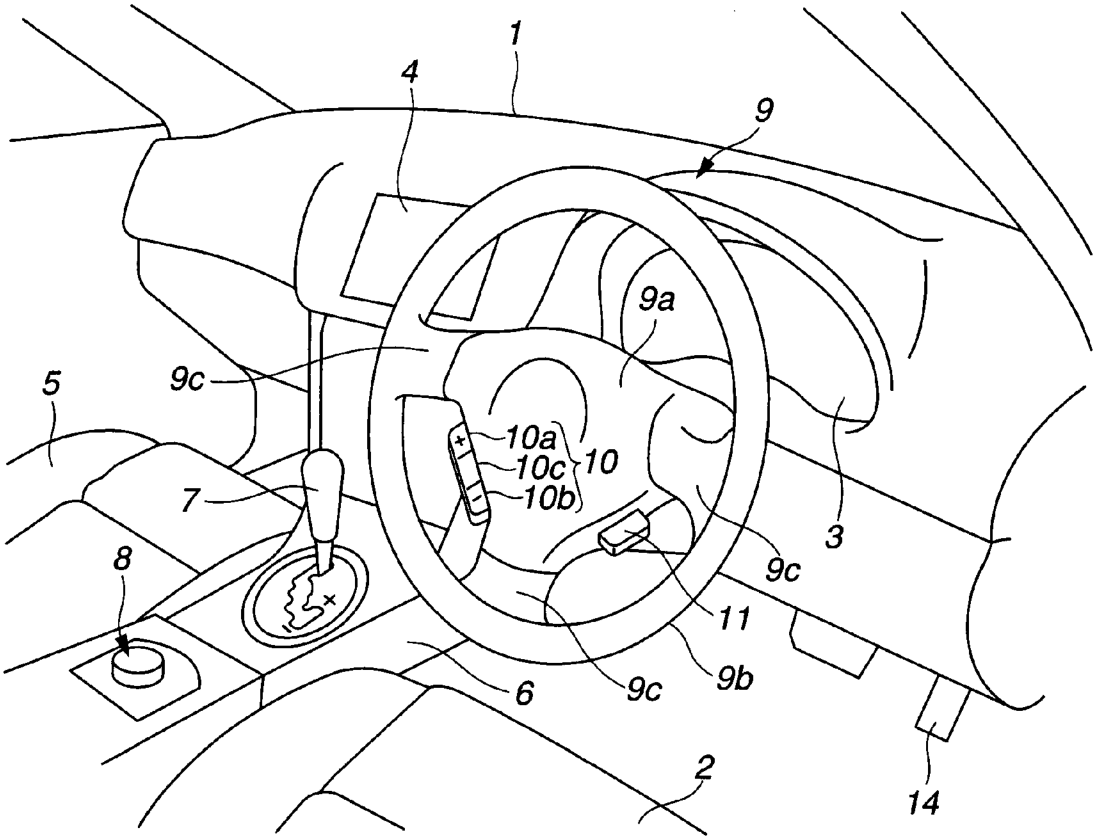
FIG. 1 is a perspective diagram shown an instrument panel and a center console seen from a driver side.

As shown in FIG. 1, an instrument panel 1 is provided to a front part in a cabin of a vehicle and extends in the width direction of the vehicle. The instrument panel 1 has a combination meter 3 at a position in front of a driver's seat 2. The instrument panel 1 also has a center display 4 for a known car navigation system at a central position thereof.

A center console 6 is disposed between the driver's seat 2 and a passenger's seat 5 and extends from the instrument panel 1 side toward the rear part of the vehicle body. The center console 6 is provided with a select lever 7 for selecting an automatic transmission range, and a mode select switch 8 at the rear of the select lever 7 for mainly selecting a driving power performance of an engine of the vehicle. A steering wheel 9 is further provided in front of the driver's seat 2.

The steering wheel 9 has a center pad portion 9*a* for housing an air-bag therein, and the center pad portion 9*a* is coupled to right, left, and lower portions of an outer peripheral grip portion 9*b* via three spokes 9*c*. A display change-over switch 10 is mounted to the lower left portion of the center pad portion 9*a*, and a temporarily change-over switch 11 is mounted to the lower right portion of the center pad portion 9*a*.

Figure 2:
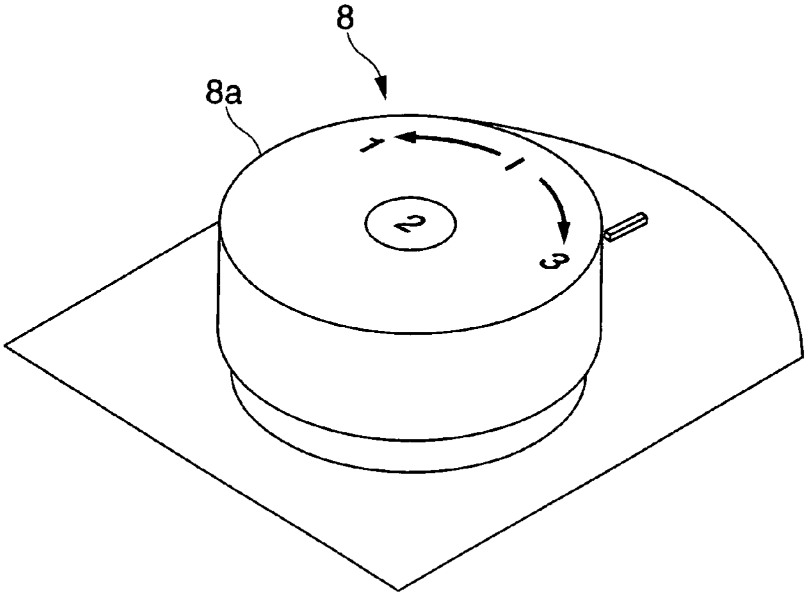
FIG. 2 is a perspective diagram showing a mode select switch.

As shown in FIG. 2, the mode select switch 8 is a shuttle switch having a push switch thereon, and an operation of a circular operation control knob 8*a* by an operator (usually a driver, and so hereinafter, simple referred to as a "driver") enables a selection of an engine mode M as one of the three control modes (a normal mode m1 and a save mode m2 as an output restricted mode, and a power mode m3 as a high output mode) which will be explained below. That is, in the present embodiment, a rotation of the operation control knob 8*a* to the left (in the direction designated by the reference number 1 of FIG. 2) causes the left side switch to be turned on to select the normal mode m1, and a rotation of the operation control knob 8*a* to the right (in the direction designated by the reference number 3 of FIG. 2) causes the right side switch to be turned on to select the power mode m3, and also a push of the operation control knob 8*a* downward (in the direction to press down the position designated by the reference number 2 of FIG. 2) causes the push switch to be turned on to select the save mode m2. The save mode m2 is assigned to the push switch, so that for example even if the push switch is turned on by mistake while driving, because an output torque is restricted in the save mode m2 as described below, a sudden increase of a driving power due to the switching of the control mode into the save mode m2 can be prevented, and a driver can continue to drive with ease.

Now, output performances of each modes m1 to m3 will be simply explained. The normal mode m1 is suitable to a normal driving, because an output torque in the normal mode m1 is set to approximately linearly change in proportion to the amount of an accelerator pedal 14 to be depressed (accelerator opening-degree) (see FIG. 8A), the accelerator pedal 14 being a unit configured to require an output by an external operation.

The save mode m2 is set to allow an enjoyable accelerator control with a smooth output performance based on a secured sufficient output by saving an engine torque, for example by synchronizing the torque with a lock-up control of a transmission in the automatic transmission equipped vehicle. Moreover, the save mode m2 in which an output torque is restricted can achieve well balanced properties of easy drive and good fuel economy (economical efficiency). For example, in a three-liter engine equipped vehicle, the save mode m2 allows a smooth output performance based on a secured sufficient output which corresponds to a two-liter engine, and is set to provide a performance for easy handling in practical regions such as town.

The power mode m3 is set to be a power-oriented mode with an output performance which is responsive to an engine from a low speed range to a high speed range. And, in an automatic transmission equipped vehicle, a sporty running condition on a winding road, for example, can be achieved by changing the shift-up points in matching with an engine torque. That is, the power mode m3 is set to be highly responsive to the amount of the accelerator pedal 14 to be depressed, and for example, in a three-liter engine equipped vehicle, the power mode m3 is set to generate the maximum torque at an early timing so as to achieve the maximum potential of the three-liter engine. The target outputs (target torques) of these control modes (the normal mode m1, the save mode m2, and the power mode m3) are set based on two parameters of an engine speed and an accelerator opening-degree as described below.

The display change-over switch 10 is operated to switch information displayed on a multi-information display (not shown) which is disposed to a position such as that on the instrument panel 1 or the combination meter 3 which is easily seen from a driver, and includes a forward switch portion 10*a*, backward switch portion 10*b*, and a returning-to-initial screen switch portion 10*c*. For example, a display screen of a mileage (odometer and trip meter), a display screen of fuel consumption (average fuel consumption and instant fuel consumption), a display screen of driving time after ignition turned on, a display screen of a possible mileage depending on a remained fuel, and a display screen of an accelerator-torque relationship line in a selected engine mode are switched to be displayed on the multi-information display. In the display screen of an accelerator-torque relationship line, an accelerator-torque relationship line is plotted in a graph having a vertical axis for output torque of an engine and a horizontal axis for accelerator opening-degree, and the accelerator-torque relationship line is indicated in association with the up and down of the accelerator opening-degree.

Figure 3:
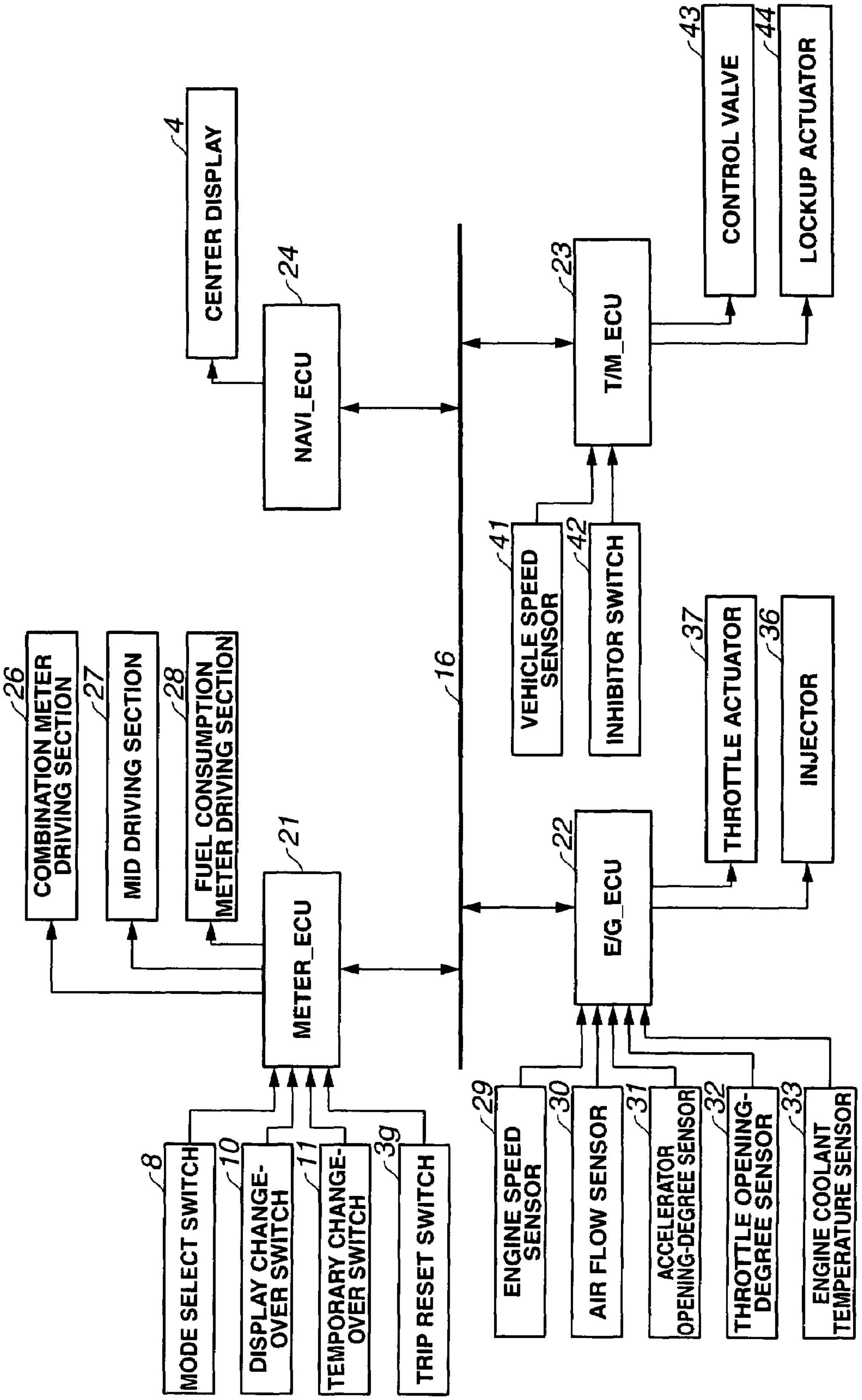
FIG. 3 is a block diagram showing a driving power control apparatus.

As shown in FIG. 3, the vehicle is connected to control apparatuses including a meter control device (meter ECU) 21, an engine control device (E/G ECU) 22, a transmission control device (T/M ECU) 23, and a navigation control device (navi ECU) 24 through an in-vehicle communication line 16 such as CAN (Controller Area Network) in an intercommunicating manner. Each of the ECUs 21 to 24 is configured with a computer such as a microcomputer as a main body, and has a nonvolatile storing unit such as known CPU, ROM, RAM, and EEPROM.

The meter ECU 21 controls the entire display of the combination meter 3, and is connected at the input side thereof to the mode select switch 8, the display change-over switch 10, the temporarily change-over switch 11, and a trip reset switch. The meter ECU 21 is also connected at the output side thereof to a combination meter driving section 26 for driving the combination meter 3 including a tachometer, a speed meter, an engine coolant temperature meter, and a fuel level meter, a warning lamp, and etc., a MID driving section 27 for driving the multi-information display, and a fuel consumption meter driving section 28 for driving the fuel consumption meter.

The E/G ECU 22 controls the entire engine, and is connected at the input side thereof to sensors for detecting the vehicle and engine driving conditions, including an engine speed sensor 29 for detecting an engine speed from the rotation of a crankshaft and the like, an air flow sensor 30 for detecting the intake air flow which is disposed just downstream of an air cleaner, an accelerator opening-degree sensor 31 as a required output detecting unit (accelerator opening-degree detecting unit) for detecting an accelerator opening-degree, that is the required output from a driver, from the amount of the accelerator pedal 14 to be depressed, a throttle opening-degree sensor 32 for detecting the position of a throttle valve (not shown) which adjusts an intake air flow to be supplied to each cylinder of the engine through intake passages, and an engine coolant temperature sensor 33 for detecting a coolant temperature which shows the temperature of the engine. The E/G ECU 22 is also connected at the output side thereof to actuators for controlling the engine drive, including an injector 36 for injecting a measured predetermined amount of a fuel to each combustion chamber of each cylinder, and a throttle actuator 37 which is mounted to an electronic controlled throttle device (not shown).

The E/G ECU 22 sets a fuel injection timing for the injector 36 and a fuel injection pulse width (pulse time) based on the signals detected by the sensors. The E/G ECU 22 also outputs a throttle opening-degree signal to the throttle actuator 37 which drives the throttle valve so as to control the opening-degree of the throttle valve.

A nonvolatile storing unit provided to the E/G ECU 22 stores a plurality of driving power performances in the form of maps. In the present embodiment, three mode maps Mp1, Mp2, and Mp3 are provided for each driving power performance, and as shown in FIG. 8A to FIG. 8C, each of the mode maps Mp1, Mp2, and Mp3 is a three dimensional map with lattice axes for accelerator opening-degree and engine speed, and basic target torques TRQ1, TRQ2, and TRQ3 are individually stored in each lattice point thereof.

Each of the mode maps Mp1, Mp2, and Mp3 is basically selected by an operation of the mode select switch 8. That is, when the normal mode m1 is selected by the mode select switch 8, the normal mode map Mp1 is selected as a mode map, while when the save mode m2 is selected, the save mode map Mp2 is selected, and when the power mode m3 is selected, the save mode map Mp3 is selected.

Now, the driving power performance of each of the mode maps Mp1, Mp2, and Mp3 will be explained below. The normal mode map Mp1 shown in FIG. 8A is set to have characteristics that the basic target torque TRQ1 linearly changes at the region where the accelerator opening-degree is relatively low, and the torque reaches its maximum around the wide open throttle valve.

Compared to the above described normal mode map Mp1, the save mode map Mp2 shown in FIG. 8B is set to have characteristics that the increase of the basic target torque TRQ2 is restricted so that even when the accelerator pedal 14 is fully depressed, the output torque is restricted, which allows a driver to enjoy accelerator control by fully depressing the accelerator pedal 14 for example. In addition, the restricted increase of the basic target torque TRQ2 provides well balanced properties of easy drive and fuel economy performance. For example, in a three-liter engine equipped vehicle, the save mode map Mp2 allows a smooth output performance based on a secured sufficient output which corresponds to a two-liter engine, and is set to provide a performance for easy handling in practical regions such as town.

The power mode map Mp3 shown in FIG. 8C is set to have characteristics that the change rate of the basic target torque TRQ3 relative to the change of the accelerator opening-degree is set higher than other mode maps across the almost entire driving region. Therefore, for example, in a three-liter engine equipped vehicle, a basic target torque TRQ3 is set to achieve the maximum potential of the three-liter engine. Each of the mode maps Mp1, Mp2, and Mp3 is set to have an extremely low speed region including idle speed which provides almost identical driving power performance.

In this way, according to the present embodiment, upon an operation of the mode select switch 8 by a driver to select one of the modes m1, m2, and m3, a correspond mode maps Mp1, Mp2, or Mp3 is selected, and based on the corresponding mode map Mp1, Mp2, or Mp3, a basic target torque TRQ1, TRQ2, or TRQ3 is set, which allows the driver to enjoy three completely different accelerator responses in one vehicle. The opening and closing speed of the throttle valve is set to slowly move in the save mode map Mp2 and to quickly move in the power mode map Mp3.

The T/M ECU 23 controls the transmission of the automatic transmission, and is connected at its input side to a vehicle speed sensor 41 as vehicle speed detecting unit configured to detect a vehicle speed from the revolution of the transmission output shaft and the like, an inhibitor switch 42 for detecting a range in which the select lever 7 is set, and also is connected at its output side to a control valve 43 for controlling the automatic transmission and a lockup actuator 44 for causing a lockup clutch to lockup. The T/M ECU 23 determines a set range of the select lever 7 based on the signal from the inhibitor switch 42, and when a D range is set, in accordance to a predetermined shift pattern, the T/M ECU 23 outputs a transmission signal to the control valve 43 to control the transmission. The shift pattern is variably set in response to the modes m1, m2, and m3 set in the E/G ECU 22.

When a lockup condition is met, the T/M ECU 23 outputs a slip lockup signal or a lockup signal to the lockup actuator 44 to switch the input/output elements of a torque converter from a converter state to a slip lockup state or a lockup state.

At this point, the E/G ECU 22 corrects a target torque re by synchronizing the target torque τe to the slip lockup state and the lockup state. As a result, for example, when the engine mode M is set to the save mode m2, the target torque τe is corrected to a value within a range for more economical running.

The navi ECU 24 is provided to a known car navigation system, and detects the position of the vehicle based on the position data obtained from GPS satellite or the like, and also calculates a leading passageway to a destination. Then, the current position of the vehicle and the leading passageway to the destination is displayed to the map data on the center display 4. In the present embodiment, the center display 4 is configured to display various information to be displayed on the multi-information display.

Next, a program to control the driving state of an engine which is executed by the above described E/G ECU 22 will be explained in accordance with the flowcharts of FIG. 4 to FIG. 7.

Figure 4:
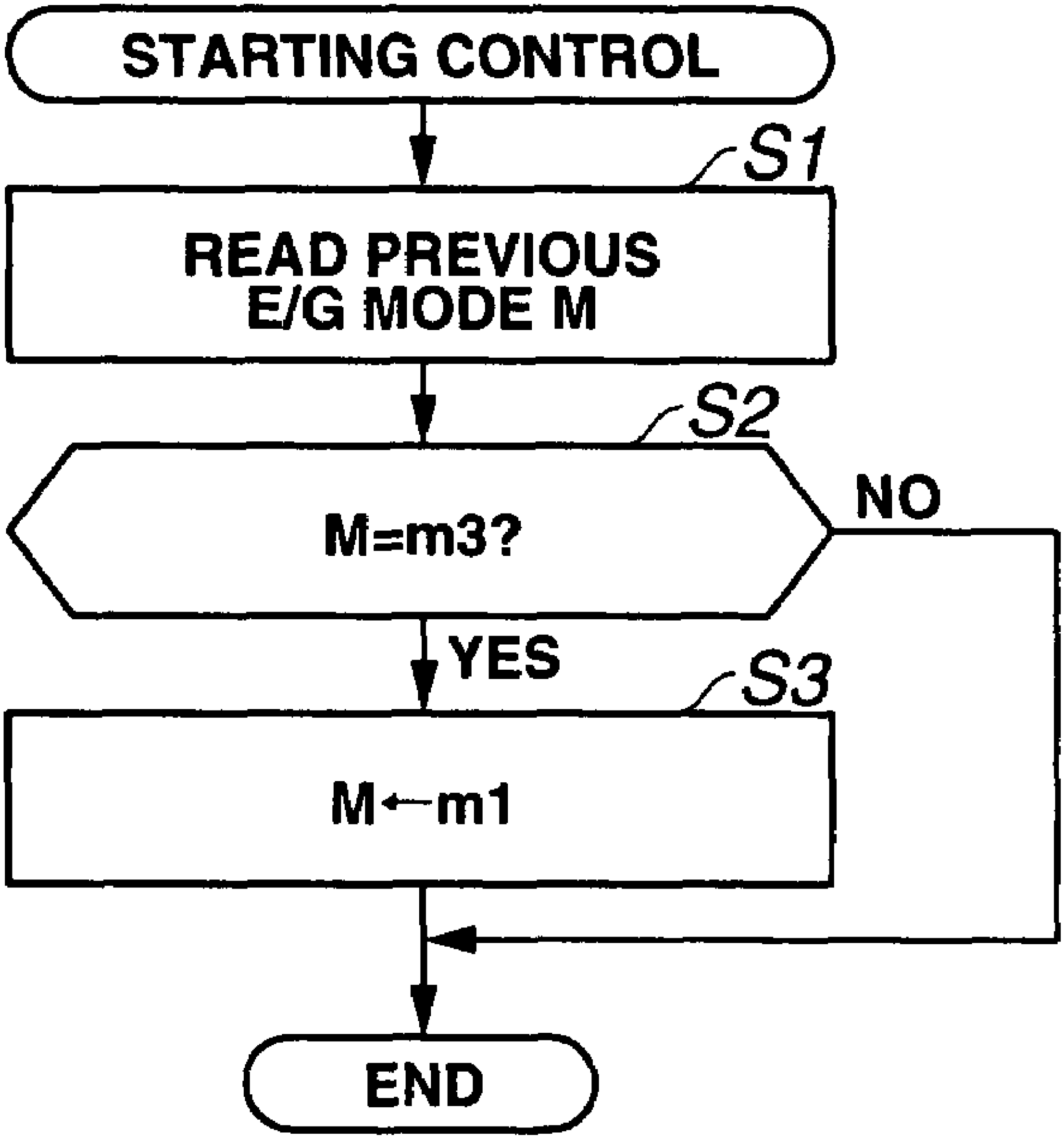
FIG. 4 is a flowchart illustrating a starting control routine.

First, a turning-on of the ignition switch causes the starting control routine shown in FIG. 4 to start only once. In this routine, first, at step S1, the engine mode M (M: normal mode m1, save mode m2, and power mode m3) which was set at the point of the previous turning-off of the ignition switch is read.

At step S2, it is checked if the engine mode M is the power mode m3 or not. When the power mode m3 is set, the engine mode M is forced to be set to normal mode m1 (M←m1), and the program exits the routine.

When the normal mode m1 or the save mode m2 other than the power mode m3 is set as the engine mode M, the program exits the routine without any process.

As described above, when it is found that the power mode m3 was set as the engine mode M at the point of the previous turning-off of the ignition switch, the engine mode M is forced to be set to normal mode m1 at this point of the turning-on of the ignition (M←m1). Therefore, a further depression of the accelerator pedal 14 does not cause a sudden start of the vehicle, thereby an excellent starting performance can be attained.

Figure 5:
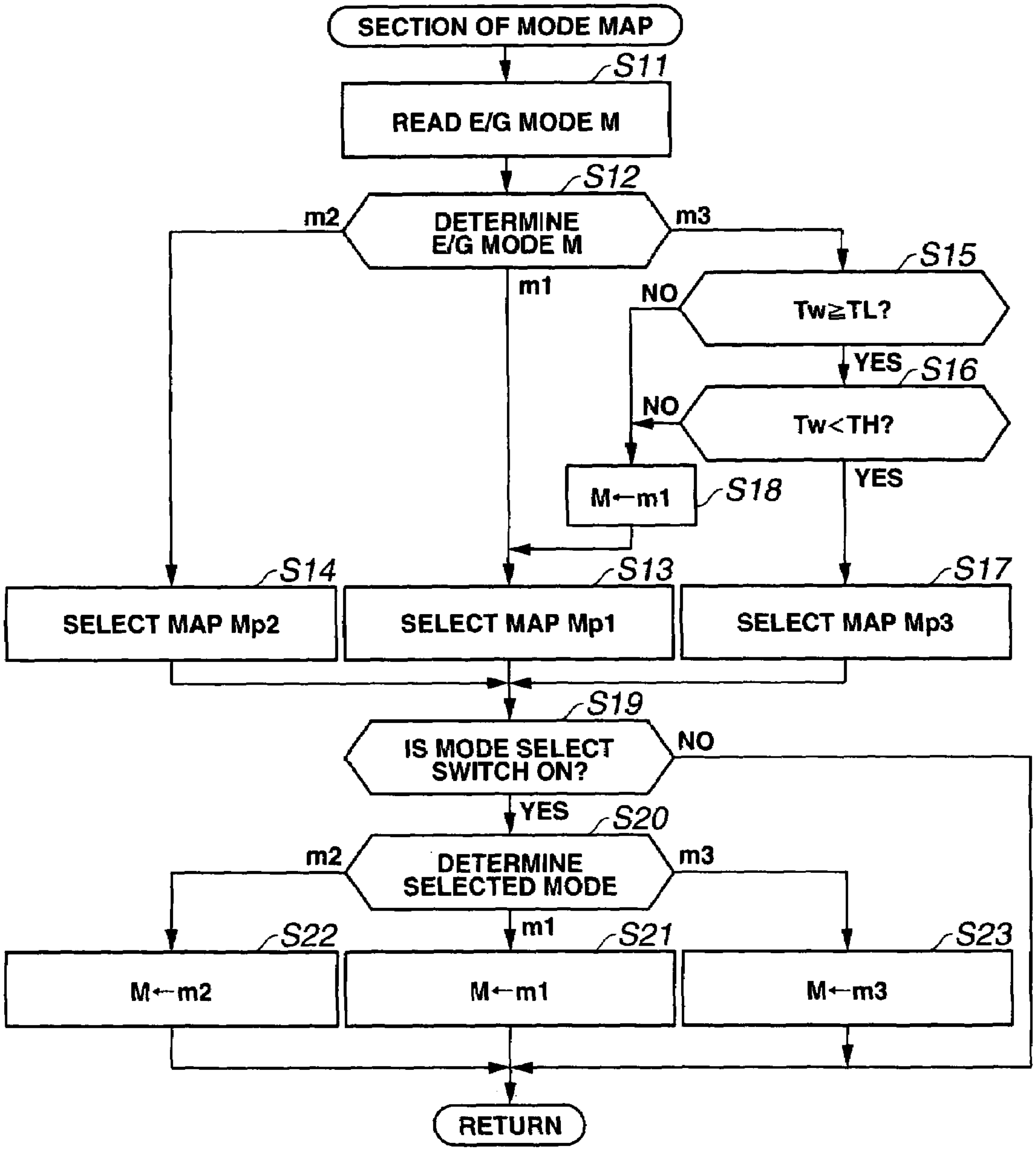
FIG. 5 is a flowchart illustrating a mode map selection routine.
Figure 6:
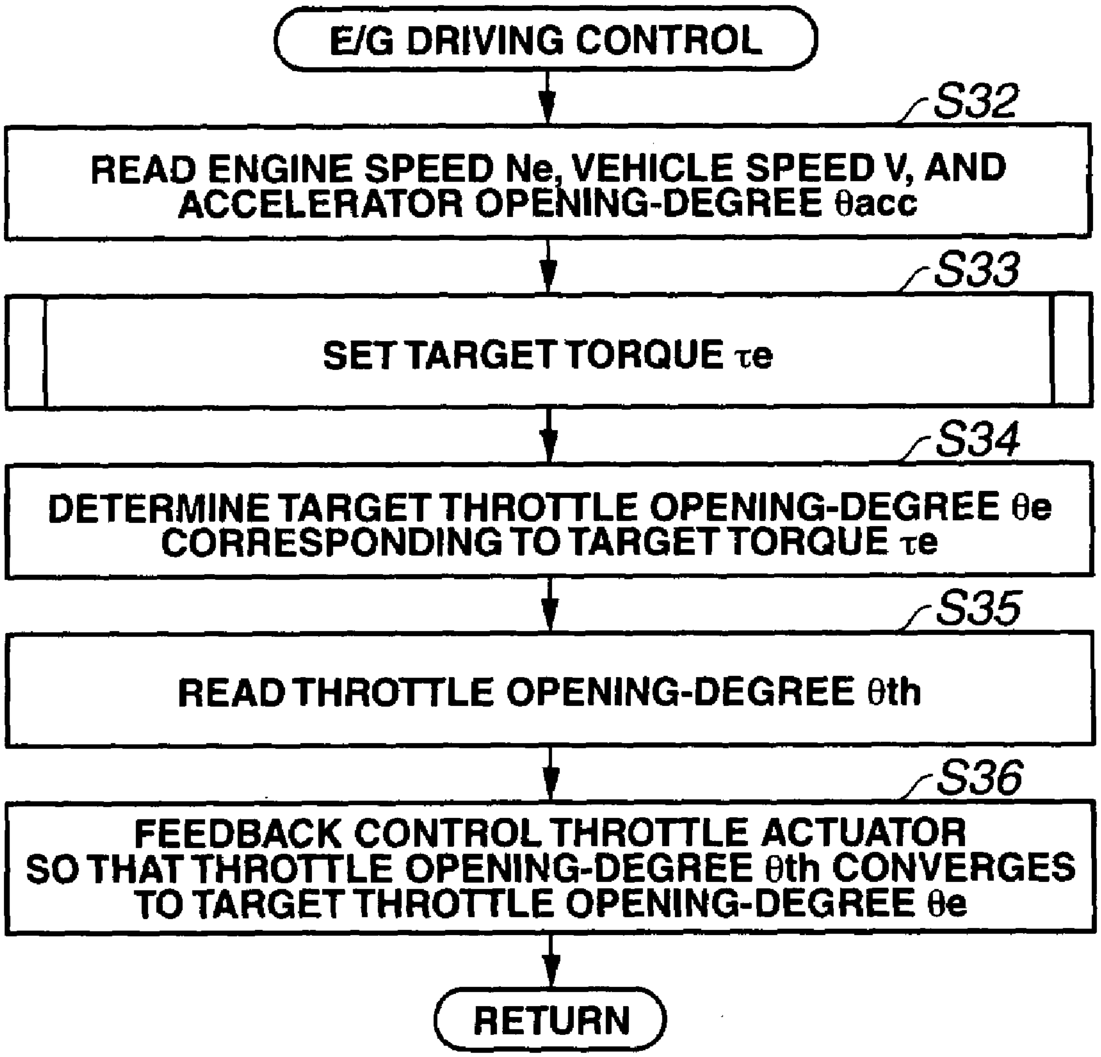
FIG. 6 is a flowchart illustrating an engine driving control routine.
Figure 7:
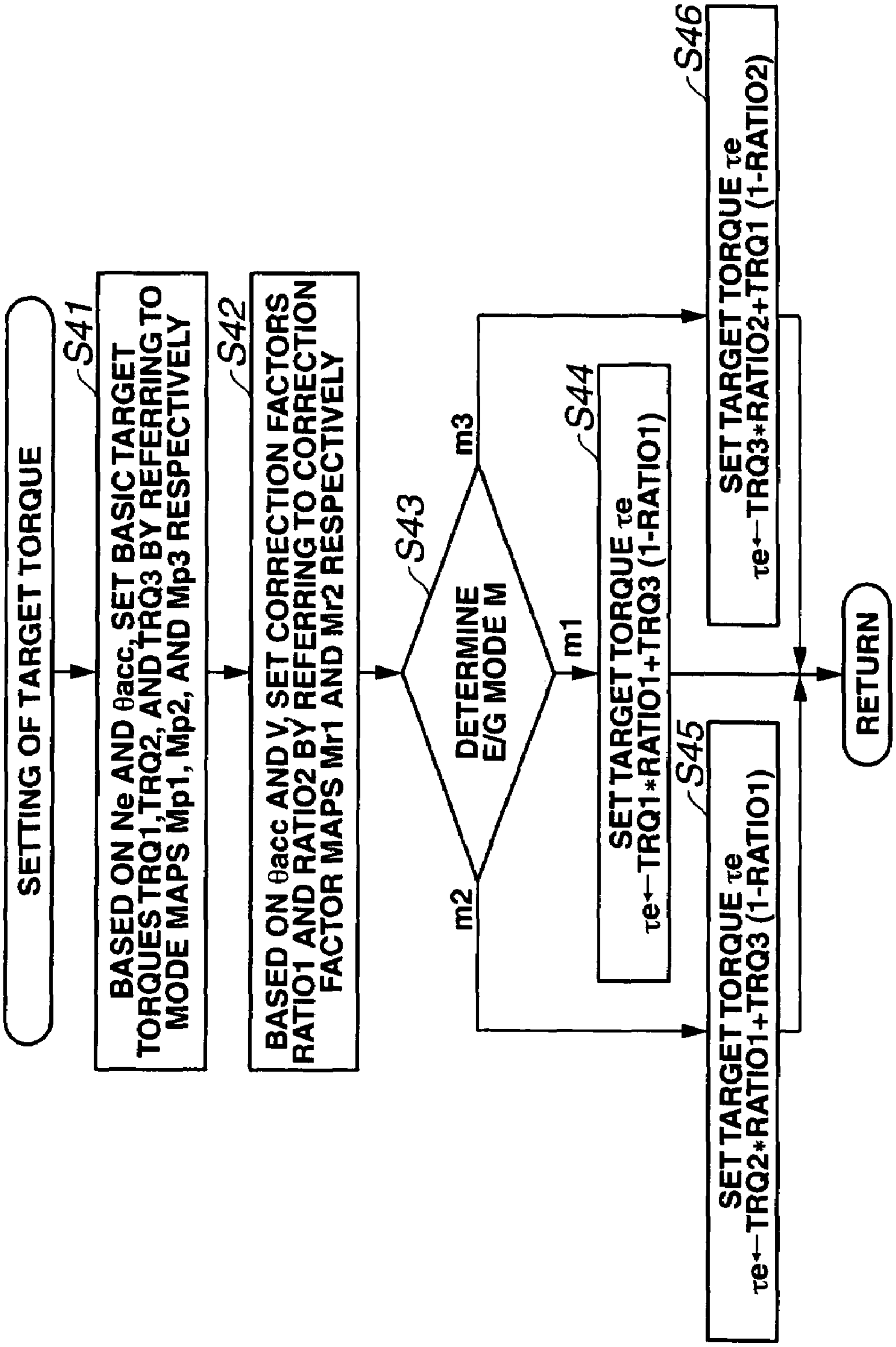
FIG. 7 is a flowchart illustrating a target torque setting subroutine.

Once the starting control routine ends, the routines shown in FIG. 5 to FIG. 7 are executed for every predetermined operation period. First, the mode map selecting routine shown in FIG. 5 will be explained.

In this routine, first, at step S11, the currently-set engine mode M is read, and at step S12, it is checked which one of the modes (normal mode m1, save mode m2, or power mode m3) is set, with reference to the value of the engine mode M. When the normal mode m1 is set, the program goes to step S13, and when the save mode m2 is set, the program branches to step S14, and when the power mode m3 is set, the program branches to step S15. Because the normal mode m1 or the save mode m2 is set as the engine mode M at the point of the first execution of the routine after the turning-on of the ignition switch, the program does not branch to step S15. However, after the turning-on of the ignition switch, if a driver turns the operation control knob 8*a* of the mode select switch 8 to the right to select the power mode m3, because the power mode m3 is set as the engine mode M at step S23 which will be explained later, in executing the routine after the selection, the program at step S12 branches to step S15.

After the determination that the normal mode m1 is set, at step S13, the normal mode map Mp1 stored in the nonvolatile storing unit of the E/G ECU 22 is set as a mode map for this time, and the program goes to step S19. Or after the determination that the save mode m2 is set, and the program branches to step S14, the save mode map Mp2 is set as a mode map for this time, and the program goes to step S19.

Meanwhile, after the determination that the power mode m3 is set, and the program branches to step S15, at step S15 and S16, the engine coolant temperature sensor 33 detects a coolant temperature Tw, a warm up determining temperature TL, and a high temperature determining temperature TH, which are then compared. If it is determined that the coolant temperature Tw is equal to or more than the warm up determining temperature TL at step S15 ($Tw \geqq TL$), and also it is determined that the coolant temperature Tw is less than the high temperature determining temperature TH at step S16 ($Tw < TH$), the program goes to step S17.

If it is determined that the coolant temperature Tw is less than the warm up determining temperature TL at step S15 ($Tw < TL$), or it is determined that the coolant temperature Tw is equal to or more than the high temperature determining temperature TH at step S16 ($Tw \geqq TH$), the program branches to step S18 to set the normal mode m1 as the engine mode M (M←m1), and goes back to step S13.

In this way, in the present embodiment, even if a driver operates the mode select switch 8 to select the power mode m3 after the turning-on of the ignition switch, when the coolant temperature Tw is equal to or less than the warm up determining temperature TL or is equal to or more than the high temperature determining temperature TH, the engine mode M is forced to be set to normal mode m1. Thereby, in warming up of the engine, the amount of exhaust emission is restricted, and at a high temperature of the engine, the output is restricted, so that the engine and its peripheral devices can be protected from heat damages. When the engine mode M is forced to be set to normal mode m1, the warning lamp 3*f* lights or blinks to inform the driver that the engine mode M is forced to return to normal mode m1. In this case, a buzzer or an audio message may be used to inform the returning.

Then, the program goes from one of step S13, S14, or S17 to step S19, and it is checked that the mode select switch 8 is turned on or not, and if not, the program escapes from the routine as it is. If the mode select switch 8 is turned on, the program goes to step S20 to determine which mode the driver selects.

When it is determined the driver selects the normal mode m1 (i.e. the driver turns the operation control knob 8*a* to the left), the program goes to step S21 to set the normal mode m1 as the engine mode M (M←m1), and leaves the routine. When it is determined that the driver selects the save mode m2 (i.e. the driver pushes the operation control knob 8*a* downward), the program goes to step S22 to set the save mode m2 as the engine mode M (M←m2), and leaves the routine. When it is determined the driver selects the power mode m3 (i.e. the driver turns the operation control knob 8*a* to the right), the program goes to step S23 to set the power mode m3 as the engine mode M (M←m3), and leaves the routine.

In the present embodiment, after the turning-on of the ignition switch, since the power mode m3 can be set as the engine mode M by an operation of the operation control knob 8*a* of the mode select switch 8, the vehicle can be started in the power mode m3. However, in this case, because the driver selected the power mode m3 on purpose, if a large driving power is generated at the start of the vehicle, the driver does not panic. Moreover, as described below, at the start in the power mode m3, a correction of the engine torque is performed to restrict the engine torque, so that the driver will not be surprised by the sudden start.

Next, an engine driving control routine of FIG. 6 will be explained below.

In the routine, first, at step S32, an engine speed Ne detected by the engine speed sensor 29, an accelerator opening-degree θacc[%] detected by the accelerator opening-degree sensor 31, and a vehicle speed V [km/h] detected by the vehicle speed sensor 41 are individually read. The accelerator opening-degree θacc is expressed in terms of percentage, and the accelerator opening-degree θacc of 0[%] means that an accelerator pedal is not depressed at all, and the accelerator opening-degree θacc of 100[%] means that an accelerator pedal is fully depressed.

Then, the program goes to step S33 to set a target torque τe which is the target output. The target torque τe is set in a target torque setting subroutine which is shown in FIG. 7. In the subroutine, first, at step S41, basic target torques TRQ1, TRQ2, and TRQ3 are set based on the engine speed Ne and the accelerator opening-degree θacc, with reference to each of the mode maps Mp1, Mp2, and Mp3 with an interpolation.

Then, at step S42, correction factors RATIO1 and RATIO2 are set based on the accelerator opening-degree θacc and the vehicle speed V, with reference to a normal/save correction factor map Mr1 and a power correction factor map Mr2 with an interpolation. The program at step S42 corresponds to a correction factor setting unit.

Figure 9:
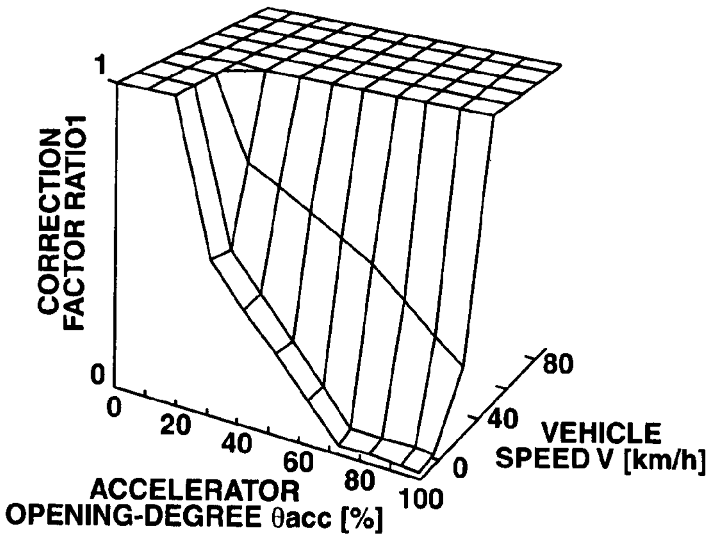
FIG. 9 is a conceptual diagram showing a normal/save correction factor map.
Figure 10:
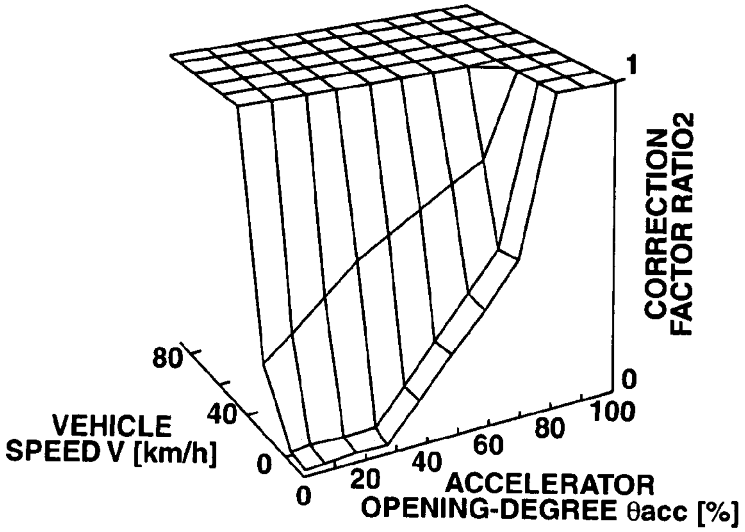
FIG. 10 is a conceptual diagram showing a power correction factor map.

FIG. 9 shows the characteristics of the normal/save correction factor map Mr1, while FIG. 10 shows the characteristics of the power correction factor map Mr2. Each of the correction factor maps Mr1 and Mr2 is a three dimensional map which has lattice axes for accelerator opening-degree θacc and vehicle speed V and the correction factors RATIO1 and RATIO2 individually stored in each lattice point thereof. The characteristics of each correction factor map Mr1 and Mr2 will be explained in detail below at steps S44 to S46.

Then, the program goes to step S43 to check which mode (normal mode m1, save mode m2, or power mode m3) is selected, with reference to the value of the engine mode M. When the normal mode m1 is set, the program goes to step S44, and when the save mode m2 is set, the program branches to step S45, and when the power mode m3 is set, the program goes to step S46. The process at step S43 corresponds to the mode determining unit. And the processes at steps S44 to S46 described below correspond to the target output setting unit.

At step S44 after the determination of the normal mode m1 as the engine mode M, the target torque τe is calculated based on the basic target torque TRQ1 which is set with reference to the normal mode map Mp1, the basic target torque TRQ3 which is set with reference to the power mode map Mp3, and the correction factor RATIO1 which is set with reference to the normal/save correction factor map Mr1, according to the following formula:

$$\tau e \leftarrow TRQ1*RATIO1+TRQ3*(1-RATIO1) \quad (1)$$

The correction factor RATIO1 is a value which represents an addition rate of the basic target torques TRQ1 and TRQ3, and as shown in FIG. 9, the normal/save correction factor map Mr1 stores the correction factor RATIO1 which rapidly decreases when the vehicle speed V is low (about 0 to 20 [km/h]) and the accelerator opening-degree θacc is high (about 70 to 100[%]) (where 0≈RATIO1), and reaches the maximum value (=1) when the vehicle speed V is equal to or more then about 20 [km/h] or the accelerator opening-degree θacc is about 20[%] or less.

According to the Formula (1), the target torque τe which is set in the normal mode m1 selected as the engine mode M increases when the vehicle speed V is around at 0 [km/h], because the addition rate of the basic target torque TRQ1 which is set with reference to the normal mode map Mp1 decreases and the addition rate of the basic target torque TRQ3 which is set with reference to the power mode map Mp3 increases as the accelerator opening-degree θacc increases, in other words, as the required output by a driver increases. Therefore, even if the driver selected the normal mode m1 as the engine mode M, at a start of a vehicle under a high load such as a hill start, a deep depression of the accelerator pedal 14 causes the engine torque to be increased, thereby a smooth starting performance can be attained.

The correction factor RATIO1 after the start is rapidly increased to reach 1 as the vehicle speed V rises. Accordingly, the addition rate of the basic target torque TRQ3 decreases and the addition rate of the basic target torque TRQ1 relatively increases, resulting in that at the point where the RATIO1=1, the target torque τe reaches the basic target torque TRQ1 which is set with reference to the normal mode map Mp1 (τe=TRG1). Therefore, a depression of the accelerator pedal 14 after start does not cause the vehicle to be suddenly started and a smooth start can be attained. In addition, after the start, the addition rate of the basic target torque TRQ1 is automatically increased and the addition rate of the basic target torque TRQ3 is relatively decreased, which gradually restricts the engine torque and achieves a better driving performance, compared to the case, for example, in which the normal mode map Mp1 and the power mode map Mp3 are switched to be used depending on an accelerator opening-degree θacc and a vehicle speed V.

When the program goes from step S43 to step S45 after the determination of the save mode m2 as the engine mode M, the target torque τe is calculated based on the basic target torque TRQ2 which is set with reference to the save mode map Mp2, the basic target torque TRQ3 which is set with reference to the power mode map Mp3, and the correction factor RATIO1 which is set with reference to the normal/save correction factor map Mr1, according to the following formula:

$$\tau e \leftarrow TRQ2*RATIO1+TRQ3*(1-RATIO1) \quad (2)$$

The characteristics of the normal/save correction factor map Mr1 is described above and will not be repeated. In the present embodiment, the normal/save correction factor map Mr1 is commonly used in the normal mode m1 and the save mode m2, but correction factor maps having different characteristics may be individually used for the modes m1 and m2.

According to the Formula (2), the target torque τe which is set in the save mode m2 selected as the engine mode M increases when the vehicle speed V is around at 0 [km/h], because the addition rate of the basic target torque TRQ1 which is set with reference to the normal mode map Mp1 decreases and the addition rate of the basic target torque TRQ3 which is set with reference to the power mode map Mp3 relatively increases as the accelerator opening-degree θacc increases. Therefore, even if a driver selected the save mode m2 as the engine mode M, at a start of a vehicle under a high load such as a hill start, a deep depression of the accelerator pedal 14 causes the engine torque to be rapidly increased, thereby a smooth starting performance can be attained.

In particular, as shown in FIG. 8B, the basic target torque TRQ2 which is set with reference to the save mode map Mp2 is the value lower than the inherent maximum output of the engine even when the accelerator pedal 14 is fully depressed, so that the throttle opening-degree θth[%] does not go up to the maximum. This may cause an insufficient torque at a start under a high load such as a hill start when the save mode m2 is set as the engine mode M although the power mode m3 may prevent the insufficient torque under the same condition. However, in the present embodiment, a depression of the accelerator pedal 14 causes the throttle valve to move beyond the upper limit throttle opening-degree which is originally restricted, thereby the engine torque is automatically increased and a smooth start performance can be attained.

The correction factor RATIO1 after the start is, as described above, rapidly increased to reach 1 as the vehicle speed V rises, and at the point where the RATIO1=1, the target torque τe reaches the basic target torque TRQ2 which is set with reference to the save mode map Mp2 (τe=TRG2). Therefore, a depression of the accelerator pedal 14 after start does not cause the vehicle to be suddenly started, and a smooth start can be attained. In addition, after the start, the addition rate of the basic target torque TRQ1 is automatically increased and the addition rate of the basic target torque TRQ3 is relatively decreased, which smoothly makes the torque fall within the original torque control range for the normal mode m1, and achieves an excellent driving performance.

When the program goes to step S46 after the determination of the power mode m3 as the engine mode M, the target torque τe is calculated based on the basic target torque TRQ3 which is set with reference to the power mode map Mp3, the basic target torque TRQ1 which is set with reference to the power mode map Mp1, and the correction factor RATIO2 which is set with reference to the power correction factor map Mr2, according to the following formula:

$$\tau e \leftarrow TRQ3*RATIO2+TRQ1*(1-RATIO2) \quad (3)$$

The correction factor RATIO2 is a value which represents a addition rate of the basic target torques TRQ1 and TRQ3, and as shown in FIG. 10, the power correction factor map Mr2 stores the correction factor RATIO2 which rapidly decreases when the vehicle speed V is low (about 0 to 20 [km/h]) and the accelerator opening-degree θacc is low (about 0 to 30[%]) (where 0≈RATIO2), and reaches the maximum value (=1) when the vehicle speed V is equal to or more then about 20 [km/h] or the accelerator opening-degree θacc is about 30[%] or more.

According to the Formula (3), the target torque τe which is set in the power mode m3 selected as the engine mode M decreases when the vehicle speed V is around at 0 [km/h], because the addition rate of the basic target torque TRQ3 which is set with reference to the power mode map Mp3 decreases and the addition rate of the basic target torque TRQ1 which is set with reference to the normal mode map Mp1 relatively increases as the accelerator opening-degree θacc decreases, in other words, as the required output by a driver decreases. Therefore, even if the driver selected the power mode m3 as the engine mode M, at a start of a vehicle, a slight depression of the accelerator pedal 14 causes the engine torque to be transited to the normal mode side, thereby an excess torque can be prevented, and a smooth starting performance can be attained.

The correction factor RATIO2 after the start is rapidly increased to reach 1 as the vehicle speed V rises. Accordingly, the addition rate of the basic target torque TRQ1 decreases and the addition rate of the basic target torque TRQ3 relatively increases, resulting in that at the point where the RATIO2=1, the target torque τe reaches the basic target torque TRQ3 which is set with reference to the power mode map Mp3 (τe=TRG3). Therefore, although the amount of the accelerator pedal to be depressed after start is constant, the engine torque is automatically increased as the vehicle speed V rises, thereby a further depression of the accelerator pedal under this condition achieves an excellent acceleration response. In addition, after the start, the addition rate of the basic target torque TRQ3 is automatically increased and the addition rate of the basic target torque TRQ1 is relatively decreased, which smoothly makes the torque fall within the original torque control range for the power mode m3 and achieves an excellent driving performance, compared to the case, for example, in which the power mode map Mp3 and the normal mode map Mp1 are switched to be used depending on an accelerator opening-degree θacc and a vehicle speed V.

After the target torque τe is set at one of steps S44 to S46, the program goes to step S34 of FIG. 6, and a target throttle opening-degree θe[%] which is the final target output corresponding to the target torque τe is determined.

Next, at step S35, the throttle opening-degree θth detected by the throttle opening-degree sensor 32 is read, and at step S36, the throttle actuator 37 for opening/closing the throttle valve mounted to an electric controlled throttle device is feedback controlled so that the throttle opening-degree θth converges to the target throttle opening-degree θe, and the program leaves the routine.

As described above, the target torque τe set by the E/G ECU 22 for each engine mode M (M: m1, m2, and m3) is set to be the basic target torques TRQ1, TRQ2, and TRQ3 respectively according to the Formulas (1) to (3) when the vehicle speed V is equal to or more than a set vehicle speed (about 20 [km/h]) and the correction factors RATIO1 and RATIO2 of the correction factor maps Mr1 and Mr2 reach 1.

The basic target torque TRQ1 which linearly changes in proportion to the amount of the accelerator pedal 14 to be depressed (accelerator opening-degree θacc) is suitable to a normal driving. The basic target torque TRQ2 having the upper limit allows a driver to enjoy accelerator control by fully depressing the accelerator pedal 14 for example, and provides well balanced properties of easy drive and fuel economy performance. Therefore, in a three-liter engine equipped vehicle, a smooth output performance can be achieved while securing sufficient output which corresponds to a two-liter engine, and a performance for easy handling in practical regions such as town can be attained. The basic target torque TRQ3 which is highly responsive provides a sportier running.

As a result, a driver can enjoy three completely different accelerator responses in one vehicle. So the driver after the purchase of the vehicle can optionally select any driving power performance as desired, and can enjoy three different driving performances of three vehicles in one vehicle.

At a start under a high load such as a hill start while the normal mode m1 or the save mode m2 is set as the engine mode M, if a vehicle does not start upon a depression of the accelerator pedal 14 to some degree by a driver, the driver further depresses the accelerator pedal 14. Then the correction factor RATIO1 which is set with reference to the normal/save correction factor map Mr1 goes below 1, and accordingly as shown in the above Formula (1) or (2), the target torque τe is supplemented due to the increased addition rate of the basic target torque TRQ3 which is set with reference to the power mode map Mp3, and an excellent starting performance can be attained.

Figure 11A:
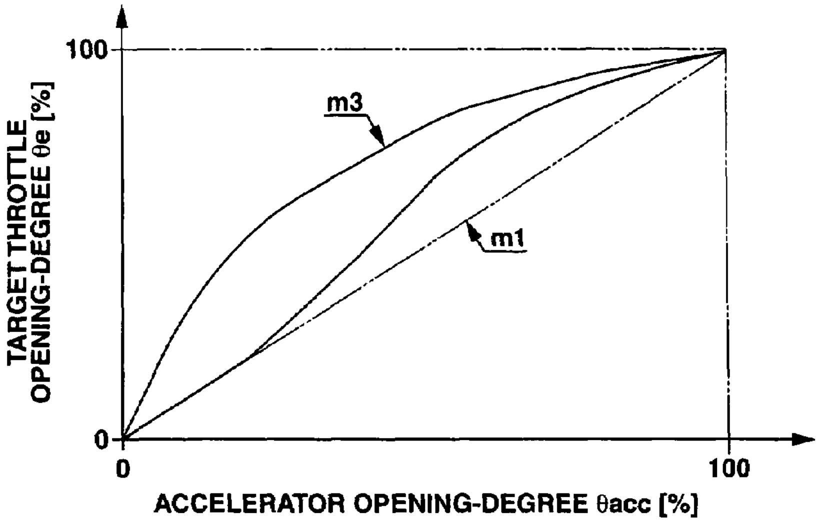
FIG. 11A is a characteristic chart showing changes of a target throttle opening-degree under a high load at the start of a vehicle, in a normal mode.

FIG. 11A shows a relationship between an accelerator opening-degree θacc and a target throttle opening-degree θe at a start under a high load in the normal mode m1 as the engine mode M.

At a start under a high load such as a hill start, if a vehicle does not start upon a depression of the accelerator pedal 14 to some degree by a driver, the driver further depresses the accelerator pedal 14. Then the target throttle opening-degree τe is corrected by an addition rate of the correction factor RATIO1 to the characteristics to be closer to the throttle opening-degree corresponding to the basic target torque TRQ3 which is set with reference to the power mode map Mp3 in the power mode m3 shown by a thinner line than to the throttle opening-degree corresponding to the basic target torque TRQ1 which is set with reference to the normal mode map Mp1 shown by a dashed line. Therefore, at a start under a high load, for example, a deep depression of the accelerator pedal 14 toward the fully depressed position (θacc=100[%]) at a low vehicle speed of about 10 [km/h] or less causes a bulge of the target throttle opening-degree θe, which causes a large increase of the output torque and achieves a smooth start of the vehicle.

Figure 11B:
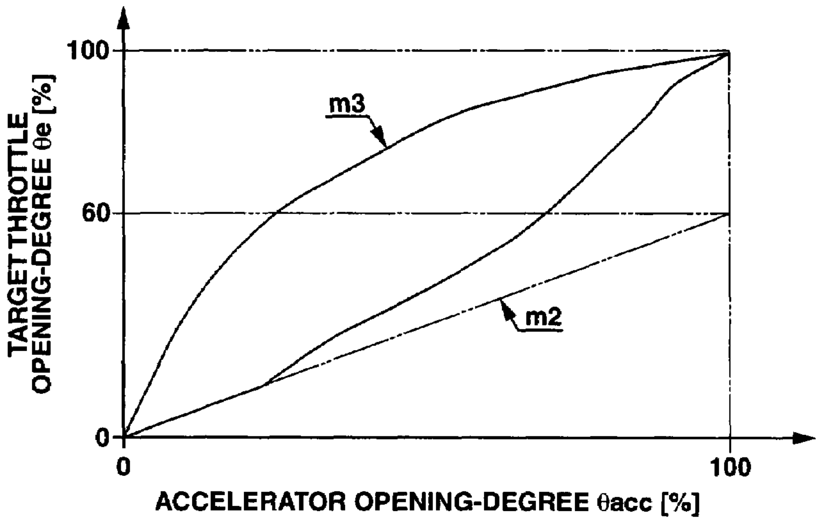
FIG. 11B is a characteristic chart showing changes of a target throttle opening-degree under a high load at the start of a vehicle, in a save mode.

FIG. 11B shows a relationship between an accelerator opening-degree θacc and a target throttle opening-degree θe at a start under a high load in the save mode m2 as the engine mode M.

As in the case described above, upon a deep depression of the accelerator pedal 14 by a driver at a start under a high load, the target throttle opening-degree θe is corrected by an addition rate of the correction factor RATIO1 to the characteristics to be closer to the throttle opening-degree corresponding to the basic target torque TRQ3 which is set with reference to the power mode map Mp3 in the power mode m3 shown by a thinner line than to the throttle opening-degree corresponding to the basic target torque TRQ2 which is set with reference to the save mode map Mp2 shown by a dashed line. Therefore, at a start under a high load, for example, a deep depression of the accelerator pedal 14 toward the fully depressed position (θacc=100[%]) in a low vehicle speed of about 10 [km/h] or less causes the target throttle opening-degree θe to be set on the side of the maximum throttle opening-degree (100[%]) beyond the originally restricted throttle opening-degree (60 [%] in FIG. 11B), which causes a large increase of the output torque and achieves a smooth start of the vehicle.

Figure 11C:
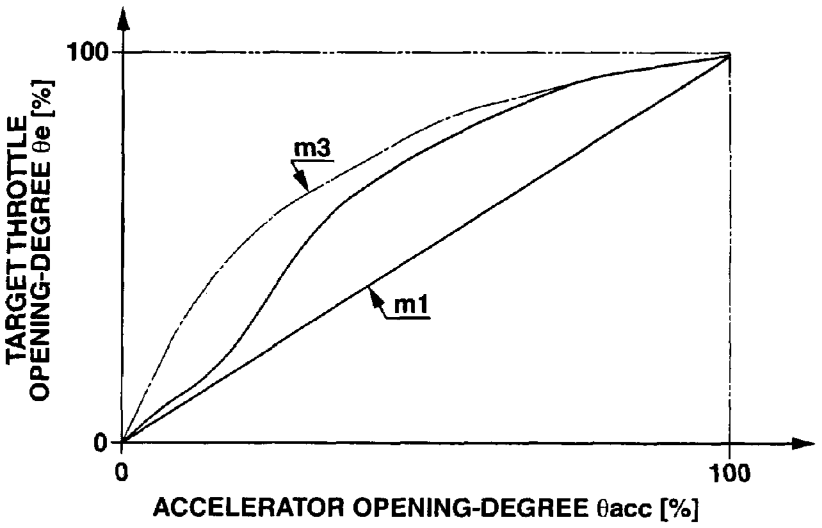
FIG. 11C is a characteristic chart showing changes of a target throttle opening-degree under a low load at the start of a vehicle, in a power mode.

FIG. 11C shows a relationship between an accelerator opening-degree θacc and a target throttle opening-degree θe at a start under a high load in the power mode m3 as the engine mode M.

In the power mode m3, upon a slight depression of the accelerator pedal 14 by a driver at a start under a low load such as a start on level ground, the target throttle opening-degree θe is corrected by an addition rate of the correction factor RATIO2 to the characteristics to be closer to the throttle opening-degree corresponding to the basic target torque TRQ1 which is set with reference to the normal mode map Mp1 in the normal mode m1 shown by a thinner line than to the throttle opening-degree corresponding to the basic target torque TRQ3 which is set with reference to the power mode map Mp3 shown by a dashed line. Therefore, at a start under a low load, for example, upon a slight depression of the accelerator pedal 14 at a low vehicle speed of about 10 [km/h] or less, an excess torque can be prevented due to the restricted target throttle opening-degree θe, so that the driver will not be surprised by a sudden start, and the vehicle smoothly starts.

Second Embodiment

Figure 12:
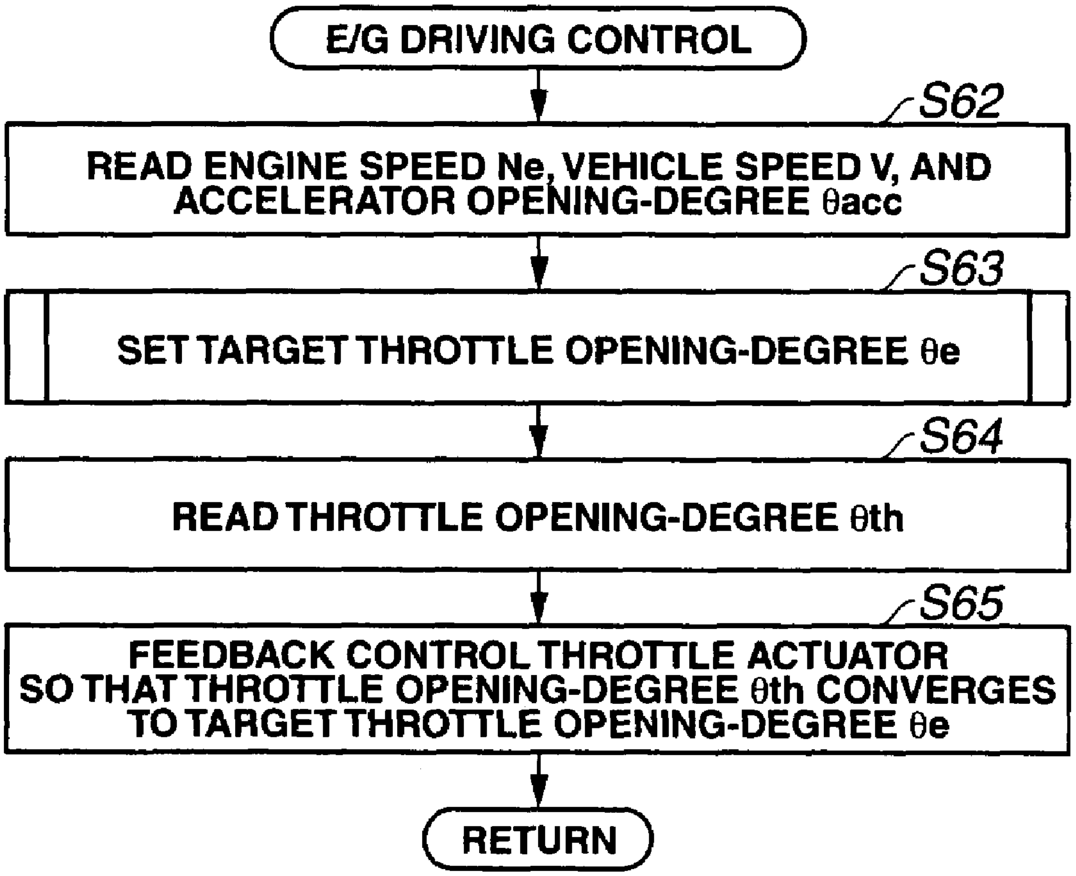
FIG. 12 is a flowchart illustrating an engine driving control routine.
Figure 13:
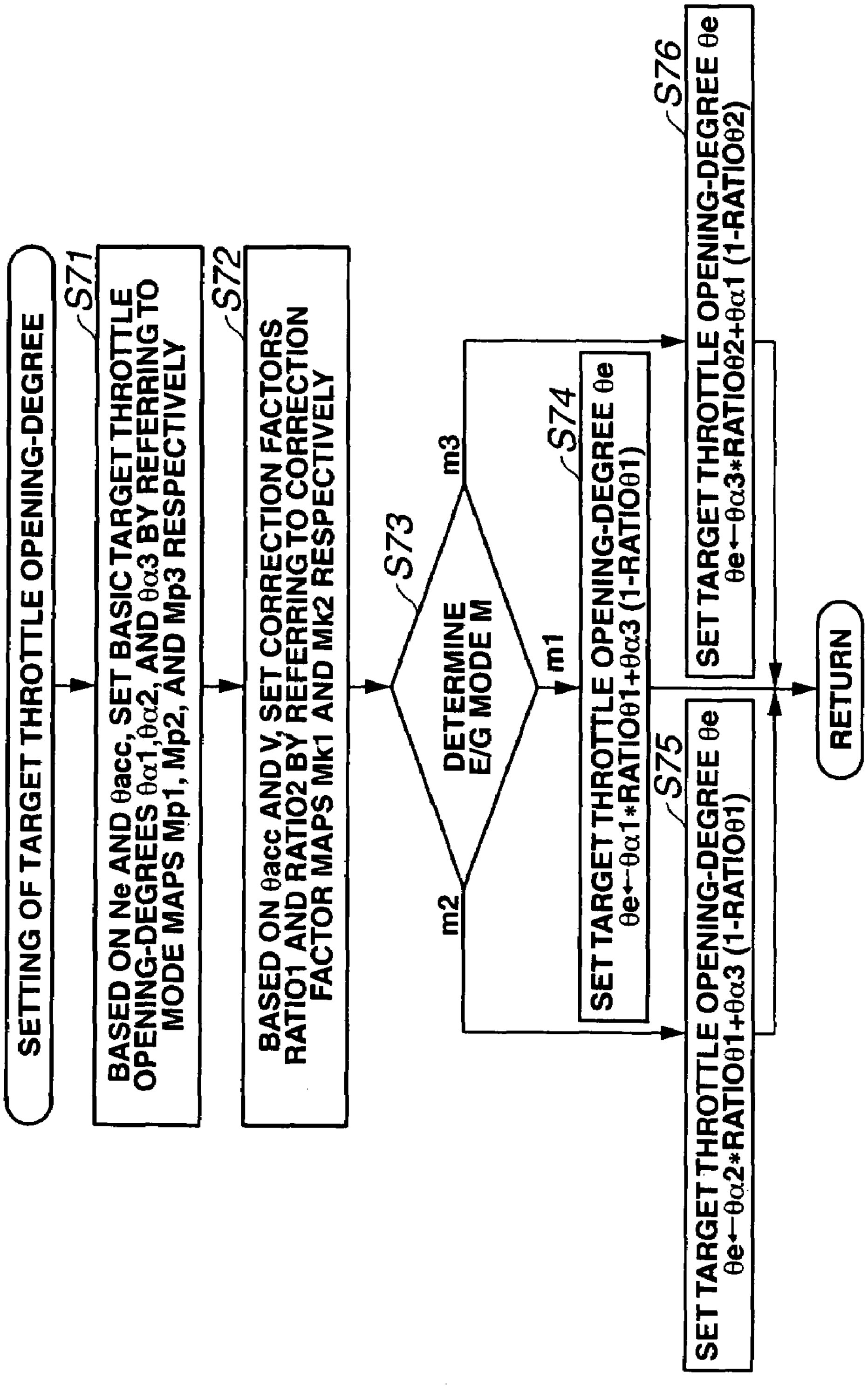
FIG. 13 is a flowchart illustrating a target throttle opening-degree setting subroutine.

The present embodiment is a modification of the above described first embodiment, and the flowcharts shown in FIG. 12 and FIG. 13 are applied instead of the flowcharts shown in FIG. 6 and FIG. 7, while each of the mode maps shown in FIG. 14 are applied instead of the each of the mode maps shown in FIG. 8. Other configurations of the present embodiment are identical to those in the first embodiment, and will not be explained below.

In the above described first embodiment, in order to set a target throttle opening-degree θe, first, basic target torques TRQ1, TRQ2, and TRQ3 are set, and based on the basic target torques TRQ1, TRQ2, and TRQ3, a target torque τe is calculated. However, in the present embodiment, basic target throttle opening-degrees θα1, θα2, and θα3 are set instead of the basic target torques TRQ1, TRQ2, and TRQ3, and based on the basic target throttle opening-degrees θα1, θα2, and θα3, a target throttle opening-degree θe is calculated.

That is, in the engine driving control routine shown in FIG. 12, first, at step S62, an engine speed Ne, an accelerator opening-degree θacc, and a vehicle speed. V [km/h] are individually read, and at step S63, a target throttle opening-degree θe which is the target output is set. The target throttle opening-degree θe is set in the target throttle opening-degree setting subroutine shown in FIG. 13. In the subroutine, first, at step S71, based on the engine speed Ne and the accelerator opening-degree θacc, basic target throttle opening-degrees θα1, θα2, and θα3 are set with reference to each of the mode maps Mpθ1, Mpθ2, and Mpθ3 shown in FIG. 14A to FIG. 14C respectively with an interpolation. Each of the mode maps Mpθ1, Mpθ2, and Mpθ3 shown in FIG. 14A to FIG. 14C is a three dimensional map which has lattice axes for accelerator opening-degree and engine speed and the basic target throttle opening-degrees θα1, θα2, and θα3 individually stored in each lattice point thereof. The characteristics of each of the mode maps Mpθ1, Mpθ2, and Mpθ3 are identical to those of the above described mode maps Mp1, Mp2, and Mp3 shown in FIG. 8A to FIG. 8C.

Next, at step S72, correction factors RATIO1 and RATIO2 are set with reference to the normal/save correction factor map Mk1 and the power correction factor map Mk2 with an interpolation based on the accelerator opening-degree θacc and the vehicle speed V. The characteristics of the normal/save correction factor map Mk1 and the power correction factor map Mk2 are identical to the maps shown in FIG. 9 and FIG. 10, and will not be explained below.

Then, the program goes to step S73 to check which mode (normal mode m1, save mode m2, or power mode m3) is selected with reference to the value of the engine mode M. When the normal mode m1 is set, the program goes to step S74, and when save mode m2 is set, the program branches to step S75, and when the power mode m3 is set, the program goes to step S76.

At step S74 after the determination of the normal mode m1 as the engine mode M, the target throttle opening-degree θe is calculated based on the basic target throttle opening-degree θα1 which is set with reference to the normal mode map Mpθ1, the basic target throttle opening-degree θα3 which is set with reference to the power mode map Mpθ3, and the correction factor RATIOθ1 which is set with reference to the normal/save correction factor map Mk1, according to the following formula:

$$\theta e \leftarrow \theta\alpha 1 * RATIO\theta 1 + \theta\alpha 3 * (1 - RATIO\theta 1) \quad (1')$$

According to Formula (1'), the target throttle opening-degree θe which is set in the normal mode m1 selected as the engine mode M increases when the vehicle speed V is around at 0 [km/h], because the addition rate of the basic target throttle opening-degree θα1 which is set with reference to the normal mode map Mpθ1 decreases and the addition rate of the basic target throttle opening-degree θα3 which is set with reference to the power mode map Mpθ3 relatively increases as the accelerator opening-degree θacc increases. Therefore, as in the first embodiment, at a start of a vehicle under a high load such as a hill start, a deep depression of the accelerator pedal 14 achieves a smooth starting performance.

The correction factor RATIOθ1 after the start is rapidly increased to reach 1 as the vehicle speed V rises. Therefore, a depression of the accelerator pedal 14 after start does not cause the vehicle to be suddenly started and a smooth start performance can be attained. In addition, after the start, the addition rate of the basic target throttle opening-degree θα1 is automatically increased and the addition rate of the basic target throttle opening-degree θα3 is relatively decreased, which smoothly makes the torque fall within the original torque control range for the normal mode m1 and achieves an excellent driving performance, as in the first embodiment.

When the program goes from step S73 to step S75 after the determination of the save mode m2 as the engine mode M, the target throttle opening-degree θe is calculated based on the target throttle opening-degree θα2 which is set with reference to the save mode map Mpθ2, the basic target throttle opening-degree θα3 which is set with reference to the power mode map Mpθ3, and the correction factor RATIOθ1 which is set with reference to the normal/save correction factor map Mk1, according to the following formula:

$$\theta e \leftarrow \theta\alpha 2 * RATIO\theta 1 + \theta\alpha 3 * (1 - RATIO\theta 1) \quad (2')$$

According to the Formula (2'), the target throttle opening-degree θe which is set in the save mode m2 selected as the engine mode M increases when the vehicle speed V is around at 0 [km/h], because the addition rate of the basic target throttle opening-degree θα1 which is set with reference to the normal mode map Mpθ1 decreases and the addition rate of the basic target throttle opening-degree θα3 which is set with reference to the power mode map Mpθ3 relatively increases as the accelerator opening-degree θacc increases. Therefore, even if a driver selected the save mode m2 as the engine mode M, at a start of a vehicle under a high load such as a hill start, a deep depression of the accelerator pedal 14 achieves a smooth starting performance, as in the first embodiment.

In particular, as shown in FIG. 14B, the basic target throttle opening-degree θα2 which is set with reference to the save mode map Mpθ2 has a characteristics that the throttle opening-degree θth[%] does not go up to the maximum even when the accelerator pedal 14 is fully depressed. This may cause an insufficient torque at a start under a high load such as a hill start in the save mode m2. However, in the present embodiment, a depression of the accelerator pedal 14 makes the engine torque automatically transit to the power mode side, and causes the throttle valve to open beyond the upper limit throttle opening-degree which is originally restricted, thereby a smooth start performance can be attained.

The correction factor RATIOθ1 after the start is, as described above, rapidly increased to reach 1 as the vehicle speed V rises. Therefore, a depression of the accelerator pedal 14 after start does not cause the vehicle to be suddenly started and a smooth start can be attained. In addition, after the start, the addition rate of the basic target throttle opening-degree θα1 is automatically increased, which smoothly makes the torque fall within the original torque control range for the save mode m2 and achieves an excellent driving performance.

When the program goes to step S76 after the determination of the power mode m3 as the engine mode M, the target throttle opening-degree θe is calculated based on the basic target throttle opening-degree θα3 which is set with reference to the power mode map Mpθ3, the basic target throttle opening-degree θα1 which is set with reference to the normal mode map Mpθ1, and the correction factor RATIOθ2 which is set with reference to the power correction factor map Mk2, according to the following formula:

$$\theta e \leftarrow \theta\alpha 3 * RATIO\theta 2 + \theta\alpha 1 * (1 - RATIO\theta 2) \quad (3')$$

According to the Formula (3'), the target throttle opening-degree θe which is set in the power mode m3 selected as the engine mode M decreases when the vehicle speed V is around at 0 [km/h], because the addition rate of the basic target throttle opening-degree θα3 which is set with reference to the power mode map Mpθ3 decreases and the addition rate of the basic target throttle opening-degree θα1 which is set with reference to the normal mode map Mpθ1 relatively increases as the accelerator opening-degree θacc decreases. Therefore, even if the driver selected the power mode m3 as the engine mode M, at a start of a vehicle, a slight depression of the accelerator pedal 14 does not causes an excess torque, and a smooth starting performance can be attained.

The correction factor RATIOθ2 after the start is rapidly increased to reach 1 as the vehicle speed V rises. Therefore the original acceleration response in the power mode m3 can be automatically attained. In addition, after the start, the addition rate of the basic target throttle opening-degree θα3 is automatically increased and the addition rate of the basic target throttle opening-degree θα1 is relatively decreased, which smoothly makes the torque fall within the original torque control range for the power mode map Mpθ3 and achieves an excellent driving performance. The process at step S74 to S76 corresponds to the target output setting unit.

After the target throttle opening-degree θe is set at one of step S74 to S76, the program goes to step S64 of FIG. 12. At step S64, the throttle opening-degree θth which detected by the throttle opening-degree sensor 32 is read, and at step S65, the throttle actuator 37 for opening/closing the throttle valve mounted to the electric controlled throttle device is feedback controlled so that the throttle opening-degree θth converges to the target throttle opening-degree θe set at step S63 described above, and the program leaves the routine.

In this way, in the present embodiment, the basic target throttle opening-degrees θα1, θα2, and θα3 are set with reference to each of the mode maps Mpθ1, Mpθ2, and Mpθ3, and based on the basic target throttle opening-degrees θα1, θα2, and θα3, the target throttle opening-degree θe is set. Thereby in addition to the advantage in the above described first embodiment, the calculation load can be reduced, which in turn provides a higher responsive performance, compared to the first embodiment in which a target torque τe is set from the basic target torques TRQ1, TRQ2 and TRQ3 and a target throttle opening-degree θe is set based on the target torque τe.

The relationship between an accelerator opening-degree θacc and a target throttle opening-degree θe at each mode of m1, m2 and m3 at a start and at a low vehicle speed is identical to those shown in FIG. 11A to FIG. 11C described above.

The present invention is not limited to the above described embodiments, and for example, two or four or more mode maps having different driving power performances map may be set. This allows a driver to enjoy driving of two or four or more vehicles which have different driving power performances in one vehicle, and in this case also, an excess torque or an insufficient torque at the start of a vehicle can be corrected by correcting a target throttle opening-degree θe from the start to a low vehicle speed driving range by using a correction factor map.

Moreover, the basic target torques TRQ1, TRQ2, and TRQ3 described in the first embodiment and the basic target throttle opening-degrees θα1, θα2, and θα3 described in the second embodiment may be calculated by using an accelerator opening-degree θacc and an engine speed Ne.

In the above embodiments, the throttle actuator 37 for driving a throttle valve mounted to an electronic controlled throttle device is controlled, but other component may be controlled instead of the throttle actuator 37, and for example in the case of a diesel engine, an injector driving apparatus is controlled so that an amount of a fuel injected by the injector driving apparatus may be set based on a target torque τe. Or in the case of an engine in which an intake valve is operated to open/close by an electromagnetic valve mechanism, the electromagnetic valve mechanism is controlled so that the position of the intake valve which is driven by the electromagnetic valve mechanism may be set based on a target torque $\tau e$.

Furthermore, in the above embodiments, an engine control apparatus having three engine modes are illustrated, but the present invention is not limited to the engine control apparatus, and the present invention may be applied to an engine control apparatus which operates in two or more engine modes having different output performances.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An engine control apparatus for controlling an engine in a mode which is set from plurality of engine control modes including at least a high output mode for controlling the engine with a higher output and an output restricted mode for controlling the engine with a lower restricted output than that in the high output mode, comprising:

mode determining unit configured to determine which one of the high output mode and the output restricted mode is set as the control mode;

vehicle speed detecting unit configured to detect a vehicle speed;

required output detecting unit configured to detect an output required by an external operation; and target output setting unit configured to set a target output by correcting an output performance in the output restricted mode into the higher output range, when the mode determining unit determines that the output restricted mode is set as the control mode, and the detected vehicle speed is low and the detected required output is large.

2. An engine control apparatus for controlling an engine in a mode which is set from plurality of engine control modes including at least a high output mode for controlling the engine with a higher output and an output restricted mode for controlling the engine with a lower restricted output than that in the high output mode, comprising:

mode determining unit configured to determine which one of the high output mode and the output restricted mode is set as the control mode;

vehicle speed detecting unit configured to detect a vehicle speed;

required output detecting unit configured to detect an output required by an external operation; and target output setting unit configured to set a target output by correcting an output performance in the high output mode into the lower output range, when the mode determining unit determines that the high output mode is set as the control mode, and the detected vehicle speed is low and the detected required output is small.

3. The engine control apparatus according to claim 1, wherein the required output detecting unit is an accelerator opening-degree detecting unit, and the target output setting unit sets the target output, when the output restricted mode is set as the control mode, by setting a correction factor for correcting the output performance of the output restricted mode to a higher output range and correcting the output performance by using the correction factor, based on the vehicle speed and the accelerator opening-degree detected by the accelerator opening-degree detecting unit and with reference to a correction factor map, when the vehicle speed is low and the accelerator opening-degree as the required output detected by the accelerator opening-degree detecting unit is high.

4. The engine control apparatus according to claim 2, wherein the required output detecting unit is an accelerator opening-degree detecting unit, and the target output setting unit sets the target output, when the high output mode is set as the control mode, by setting a correction factor for correcting the output performance of the high output mode to a lower output range and correcting the output performance by using the correction factor, based on the vehicle speed and the accelerator opening-degree detected by the accelerator opening-degree detecting unit and with reference to a correction factor map, when the vehicle speed is low and the accelerator opening-degree as the required output detected by the accelerator opening-degree detecting unit is low.

5. The engine control apparatus according to claim 3, wherein the correction factor map stores the correction factor for setting an addition rate for the output performance of the high output mode and the output performance of the output restricted mode, and the target output setting unit sets the target output according to the addition rate set by the correction factor, when the vehicle speed is low and the accelerator opening-degree is high, by adding the output performance of the high output mode by the addition rate larger than that for the output performance of the output restricted mode.

6. The engine control apparatus according to claim 4, wherein the correction factor map stores the correction factor for setting an addition rate for the output performance of the high output mode and the output performance of the output restricted mode, and the target output setting unit sets the target output according to the addition rate set by the correction factor, when the vehicle speed is low and the accelerator opening-degree is low, by adding the output performance of the output restricted mode by the addition rate larger than that for the output performance of the high output mode.

7. The engine control apparatus according to claim 3, wherein the target output setting unit sets the correction factor by an interpolation based on the vehicle speed and the accelerator opening-degree.

8. The engine control apparatus according to claim 4, wherein the target output setting unit sets the correction factor by an interpolation based on the vehicle speed and the accelerator opening-degree.

9. The engine control apparatus according to claim 5, wherein the target output setting unit sets the correction factor by an interpolation based on the vehicle speed and the accelerator opening-degree.

10. The engine control apparatus according to claim 6, wherein the target output setting unit sets the correction factor by an interpolation based on the vehicle speed and the accelerator opening-degree.

* * * * *